US006986537B2

(12) United States Patent
Robbins et al.

(10) Patent No.: US 6,986,537 B2
(45) Date of Patent: Jan. 17, 2006

(54) MULTI FACETED RETRIEVER

(76) Inventors: Chad Robbins, 1782 CR 686, Lake City, AR (US) 72437; Joey R. Cox, 20172 Crowley's Ridge Cutoff, Harrisburg, AR (US) 73432

( * ) Notice: Subject to any disclaimer, the term of this patent is extended or adjusted under 35 U.S.C. 154(b) by 307 days.

(21) Appl. No.: 10/409,572

(22) Filed: Apr. 9, 2003

(65) Prior Publication Data

US 2004/0201233 A1 Oct. 14, 2004

(51) Int. Cl.
*B66C 1/10* (2006.01)
*B25J 15/06* (2006.01)

(52) U.S. Cl. .......................... 294/2; 294/1.1; 294/65.5; 294/82.1

(58) Field of Classification Search ................. 294/1.1, 294/2, 24, 65.5, 82.1, 66.1, 66.2
See application file for complete search history.

(56) References Cited

U.S. PATENT DOCUMENTS

| | | | | |
|---|---|---|---|---|
| 2,850,189 A | * | 9/1958 | LeRoy | 414/606 |
| 3,020,079 A | * | 2/1962 | Samol | 294/65.5 |
| 4,575,143 A | * | 3/1986 | Nast | 294/65.5 |
| 5,294,162 A | * | 3/1994 | Grimes | 294/110.1 |
| 5,575,517 A | * | 11/1996 | Thomas | 294/1.1 |
| 5,762,388 A | * | 6/1998 | Futa | 294/3 |
| 5,826,928 A | * | 10/1998 | Shang | 294/24 |
| 6,106,042 A | * | 8/2000 | McCloy, Jr. | 294/100 |
| 6,315,340 B1 | * | 11/2001 | Chen | 294/24 |
| 6,663,153 B2 | * | 12/2003 | Brunson | 294/65.5 |

* cited by examiner

*Primary Examiner*—Dean J. Kramer
(74) *Attorney, Agent, or Firm*—Dennis B. Haase

(57) ABSTRACT

A multi faceted retrieval tool for use by an individual positioned above the ground in retrieving items beneath the location of the individual, comprising a series of hooks extensible beyond the periphery of the tool for engaging, securing and retrieving items which are susceptible to being engaged by a hook, and being nestable in the tool when not in use, and, further, having a magnet for the retrieval of items engageable by a magnet, and a line which is selectively extensible to engage the items to be retrieved and retractable once the item is secured to bring the item to the individual user.

7 Claims, 2 Drawing Sheets

MULTI FACETED RETRIEVER

The present invention relates generally to devices for the remote retrieval of items and is particularly suited to the retrieval of items which were, e.g., dropped from, or forgotten by, a person who has climbed to a remote elevated position such as a tree stand, or the like.

BACKGROUND OF THE INVENTION

1. Field of the Invention

As surely as death and taxes, a person, such as a hunter, will eventually climb a tree or a tree stand, or otherwise find him or herself in some remote elevated position, from which he or she will look down, horrified in the realization that an item incident to the hunt, or the hunters comfort and convenience, has fallen from his or her perch, or left below inadvertently.

Regardless of the particular circumstance, the result is the same, and the hunter is compelled to descend from his or her location to retrieve the article below or go without. Neither alternative is particularly palatable or satisfying, and, as a consequence, others have attempted to address the circumstance and pose a variety of solutions. As will be readily apparent, however, in the discourse to follow, none have succeeded in providing a global solution.

2. Overview of the Related Art

A person who chooses to perch above the ground for whatever reason, i.e., whether a hunter or observer, share a common problem. Specifically, there is a tendency to drop things, or even forget to bring with them, certain things as they ascend to their roost. The most common solution to such a dilemma, where the perch is at any significant height above the ground, is to descend and retrieve the errant item.

Not only is this movement typically disturbing to the area in proximity to the activity in which the individual involved is engaged, making the presence of the individual more readily discernable, it is often downright tiring. While the invention taught herein is not the first to address the problem, it is perhaps the most timely and useful.

In 1995, for example, Wenk issued U.S. Pat. No. 5,388,877, which attempted to address the problem of raising and lowering a bow to and from a hunting perch by means of a spring loaded fishing type reel in which a line with a hook on the end is used to snare the bow on the ground.

In 2000, McCloy took a different approach to the same problem in his U.S. Pat. No. 6,106,042, in when he attached a grasping head to a rope for retrieving such things as a cap or the like. The fingers of McCloy are selectively openable and closeable about the item to be retrieved.

Doyelle U.S. Pat. No. 5,382,935 is a rotary, magnetic grabber, but perhaps too heavy to be used in the present context, and Schroeder U.S. Pat. No. 6,073,983 is a somewhat more versatile version of a magnetic grabber, designed for the retrieval of flashing or the like from ground to roof.

Finally, Jarousch, in his U.S. Pat. No. 6,065,787 combines a magnet, single hook and an adhesive pad in a telescoping device intended for use by a person who is, for any number of reasons, unable to bend down and pick up a particular object. The device is unusable as a retriever by someone in a greatly elevated perch, e.g., a tree limb or a tree stand.

SUMMARY OF THE INVENTION

The present invention offers to the hunter, observer, or anyone else who, for whatever reason, finds him or herself perched in a tree, tree stand or the like for any length of time, a multi faceted retriever which functions to retrieve items either left on, or dropped to, the surface below.

The retriever of the present invention has, as its principal objective, the provision of a flexible tool for use primarily, although not exclusively, by hunters, or the like, who customarily and seasonally spend not insignificant periods of time in a tree stand or like perch either observing or stalking, or both, deer and other ground confined game, which permits the user to retrieve light items such as articles of clothing, arrows, cups, and the like, and magnetic and non magnetic items.

It is an objective, related to the foregoing, to provide a retriever which is capable of engaging and retrieving a variety of items ranging from articles of clothing to metallic objects.

It is a further objective to provide a hunter or the like, perched well above the earth's surface, with a small, easily handled and stowed multi faceted retrieval device capable of capturing objects below the user and returning them to a remote location above.

In addition, it is a further objective of the present invention to accomplish the forgoing objectives in a safe and dependable manner.

The foregoing, as well as other objects and advantages of the present invention, will be come apparent to those skilled in the art when the forthcoming Detailed Description of a Preferred Embodiment of the Present Invention is read in concert with the drawings, wherein:

DETAILED DESCRIPTION OF A PREFERRED EMBODIMENT OF THE PRESENT INVENTION

Figure 1:
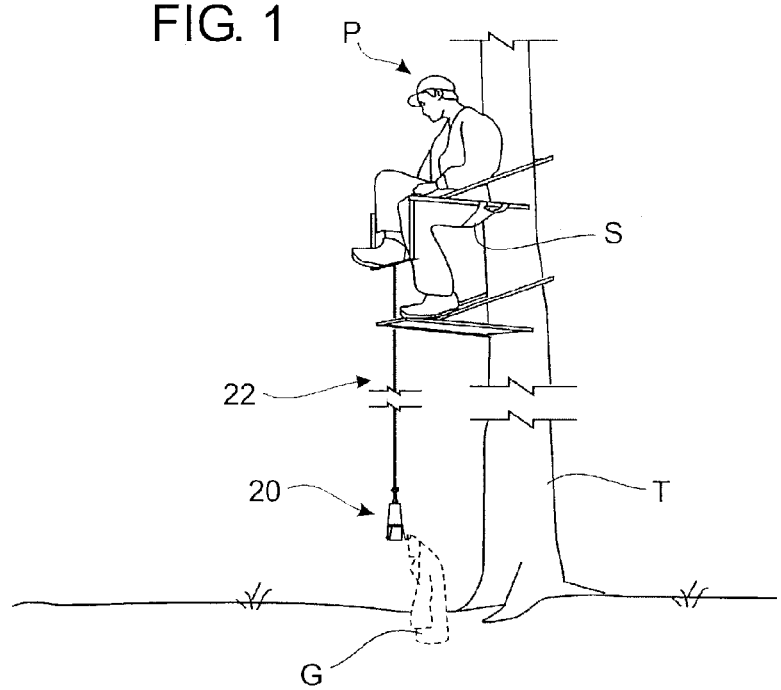
FIG. 1 is a pictorial representation of a typical environment in which a hunter in a tree stand is attempting to retrieve a garment either left on the ground below or dropped there accidently.

With reference now to the drawings, and initially to FIG. 1, an individual user P is depicted in a tree stand S secured well above the ground to a tree T. An illustrative item, such as a garment G, has either fallen from the stand S, or was inadvertently left at ground level when the individual climbed into the tree stand.

A multi faceted tool 20, constructed in accordance with the present invention, is shown at the end of a line 22 in the hands of the individual user P, the tool having been lowered by means of the line 22 to a position at or about ground level, in immediate proximity to the item to be retrieved, in a successful effort to retrieve the garment G.

Figure 2:
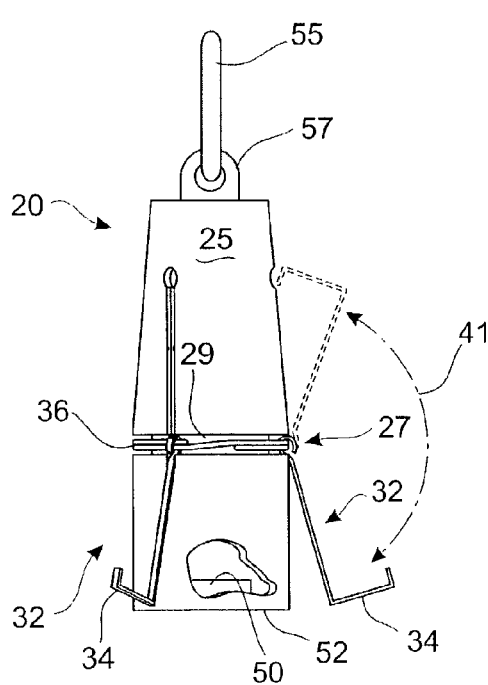
FIG. 2 is a side elevation of the multi faceted tool of the present invention, partially sectioned to show certain interior configurations.
Figure 3:
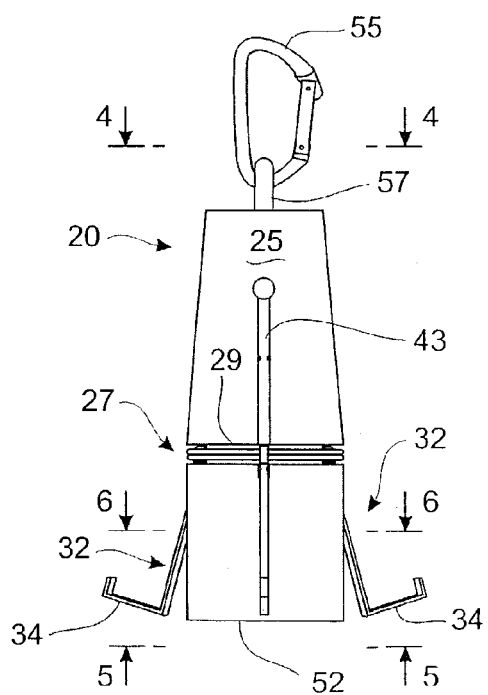
FIG. 3 is a view similar to that of FIG. 2, but rotated 90 degrees to show other features of the tool of the present invention.
Figure 4:
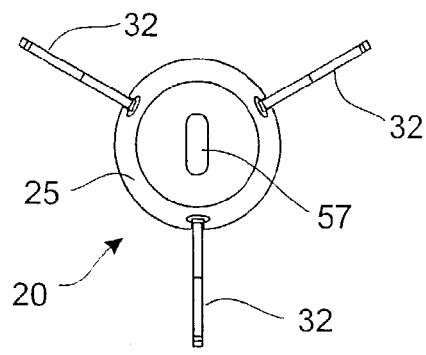
FIG. 4 is a top plan view of the tool of FIG. 1, taken along lines 4—4.
Figure 5:
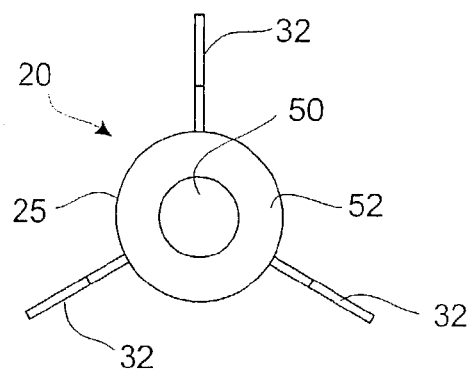
FIG. 5 is a bottom plan view of the tool of FIG. 1, taken along lines 5—5.
Figure 6:
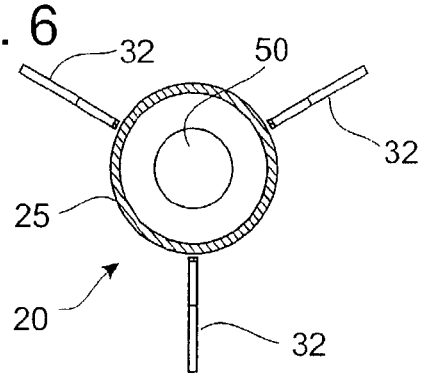
FIG. 6 is a sectional view of the tool of FIG. 1, taken along lines 6—6.
Figure 7:
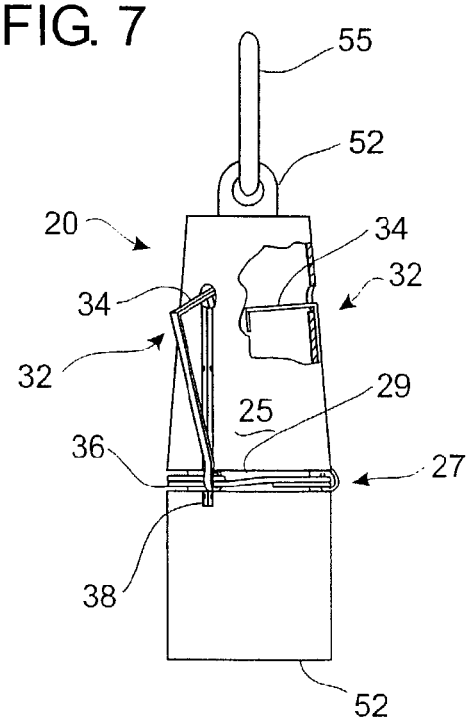
FIG. 7 is a side elevation in the nature of FIG. 2, illustrating the nesting of the hooks of the tool of the present invention.

The tool 20 is shown in side elevation in FIGS. 2, 3, and 7 and includes a body 25. The body 25 is generally cylindrically shaped, having upper and lower termini, or ends, and by virtue of a slight bulge 27 located approximately amidships of the body 25, presents a barrel shaped profile.

In keeping with the objectives of the invention to permit retrieval of items remote from the user, a circumferential slot 29 is cut or otherwise formed at the bulge 27. A series of circumferentially spaced hooks 32 are secured, at one end thereof, to the body 25 at the slot 29. Each hook is so oriented as to face downwardly and outwardly of the body 25 when deployed for use, such that the retrieval end 34 is in a position to engage and secure items, such as the garment G, when lowered into contact with such items.

It will be appreciated that the retrieval end 34 of the hook 32 is relatively sharp and, thus, a potential danger if the tool is misused or improperly or carelessly handled. In order, in keeping with this objective of the invention, to minimize the risk attendant the user of the tool, a wire band 36 is disposed in the slot 29 and the end 38, remote from the retrieval end 34, is secured to the wire band in order that the hooks may be freely rotated, generally in a plane which is coincident with the longitudinal axis of the body 25, between a retrieval position and a stowed position. The arcuate arrows 41 of FIG. 2 are illustrative of the path traversed by the hooks 32 as it is moved between the aforesaid positions.

In order to accomplish stowage of the sharp end of the hook, it will be seen in FIG. 3 that the body 25 is formed with a series of longitudinally disposed recesses 43. Each recess is coplanar with a hook 32. Thus, when a hook is in its stowed position, the retrieval end is fully encased in the slot and out of the way of the user, thereby inhibiting accidental contact.

It is yet another feature of the present invention that it is capable of retrieving ferro magnetic items. To this end, and in order to achieve this objective, a magnet 50 is provided. The magnet 50 is nested in a secure manner in the base of the tool 20 such that it is exposed in a plane transverse to the longitudinal axis at the base 52 of the tool. By virtue of the location of the magnet, the tool may be lowered by means of the line 22 into contact with an item having ferro magnetic properties and, thus, easily and efficiently retrieve the same.

The tool of the present invention is raised and lowered by means of the line 22, which is attachable to the tool by means of a snap ring 55 which is threaded through an eyelet 57 at the top of the body 25. The line is, thus, removable for storage and transportation and attached for use only as needed.

Having now discussed a preferred embodiment in considerable detail, it will be evident, particularly to those skilled in the art that some variation in structure and relative positioning of the various elements is well within the contemplation of the invention, which is claimed as follows.

What is claimed is:

1. A multi faceted retrieval tool, usable by an individual located in an elevated position above ground level, to engage, secure and retrieve a variety of items beneath the individual, comprising:

an elongate body, said body having a series of hooks disposed about its circumference, said hooks having a retrieval end, said retrieval end being outwardly facing, and extensible beyond said body so as to be in a position to engage and secure items beyond the perimeter of said retrieval tool in immediate proximity thereto;

a magnet, said magnet being attached to said body and having a portion thereof exposed to the area beneath said body, said magnet creating a continuous magnetic field beneath said body in order to retrieve items in immediate proximity to said magnet having a susceptibility to magnetic fields; and a length of line, said line being attachable to said body and being selectively extensible to a position in immediate proximity to an item to be retrieved, to thereby permit the user to engage and secure said item, said line being retractable to permit retrieval of items secured by said retrieval tool.

2. The retrieval tool of claim 1, wherein said body of said retrieval tool is generally cylindrical, and having an upper and a lower base end.

3. The retrieval tool of claim 2, wherein said magnet is embedded in said base end.

4. The retrieval tool of claim 2, wherein said body of said retrieval tool has a bulge, said bulge being near the center of said body, giving said body a generally barrel shaped appearance.

5. The retrieval tool of claim 4, wherein said hooks have an end remote from said retrieval end, said remote end being attachable to said body for relative rotation in a plane of the longitudinal axis of said body, said hooks being secured to said body at said bulge.

6. The retrieval tool of claim 5, wherein said body has a transverse slot provided in said bulge, a wire disposed in said slot and said remote end of said hooks attached to said wire for limited rotation of said retrieval end relative to said body.

7. The retrieval tool of claim 1, wherein a series of recesses are provided in said body in the plane of the longitudinal axis thereof, and each of said hooks being nestable in said recesses when not in use.

* * * * *